E. B. LOYLESS.
Cotton and Seed Planter.
No. 222,517.                    Patented Dec. 9, 1879.
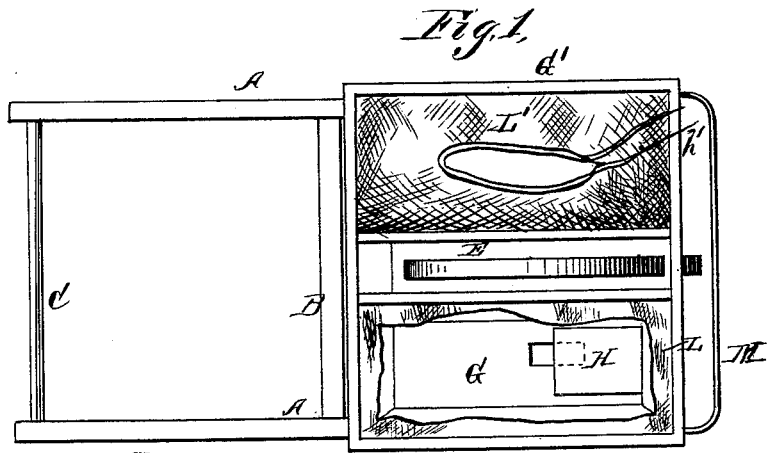
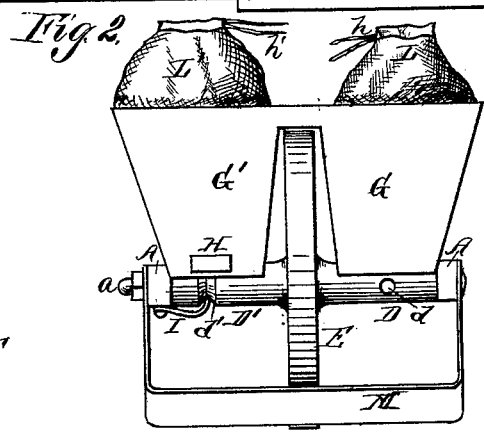
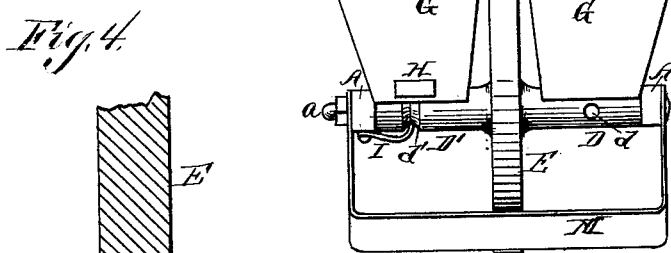
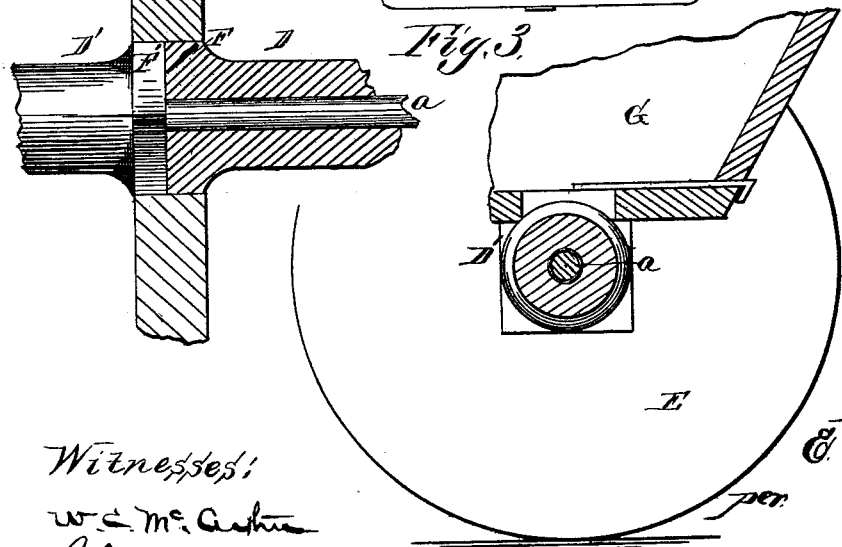

UNITED STATES PATENT OFFICE.

ELLIOTT B. LOYLESS, OF DAWSON, GEORGIA.

IMPROVEMENT IN COTTON AND SEED PLANTERS.

Specification forming part of Letters Patent No. 222,517, dated December 9, 1879; application filed August 5, 1879.

*To all whom it may concern:*

Be it known that I, ELLIOTT B. LOYLESS, of Dawson, in the county of Terrell and State of Georgia, have invented certain new and useful Improvements in Cotton and Seed Planters; and I do hereby declare that the following is a full, clear, and exact description thereof, reference being had to the accompanying drawings, and to the letters of reference marked thereon, which form part of this specification.

The nature of my invention consists in the construction and arrangement of a seed-planter and fertilizer-distributer as an attachment for any ordinary plow, as will be hereinafter more fully set forth.

In order to enable others skilled in the art to which my invention appertains to make and use the same, I will now proceed to describe its construction and operation, referring to the annexed drawings, in which—

Figure 1 is a plan view of my device. Fig. 2 is a rear view, and Figs. 3 and 4 are details of parts thereof.

A A represent two side beams, connected by a cross-bar, B, a suitable distance from their rear ends, and at their front ends by a round or cross-bar, C, which latter is to be attached or connected in any suitable manner to any ordinary plow, so that my planter and distributer will work behind the plow.

In the rear ends of the side beams, A A, a bolt or axle, $a$, is placed so as to be stationary therein, and on said bolt or axle are placed two cylinders, D and D′, having at their inner ends square heads F and F′, respectively. Between the cylinders D D′ is placed a wheel, E, having a square center hole, in which the cylinder-heads F F′ fit on opposite sides, as shown. Hence, when the wheel E revolves by the forward motion of the machine, the cylinders will turn with it.

Above the cylinders D D′ are two hoppers, G and G′, for containing the seed and fertilizer. In the cylinder D are one, two, or more holes, $d$, into which the seed, whether corn, pease, or other grain, will drop from the hopper, and as the cylinder revolves such seed will pass out and drop into the furrow made by the plow in front. The cylinder D′ is formed with a circumferential groove, $d'$, into which the fertilizer falls, and by it is deposited in the same furrow made by the plow in front.

I is a spring working in the groove $d'$, to scrape out all the fertilizer that does not fall out of the groove.

In the end of the hopper G′ is a slide, H, to regulate the flow of the fertilizer, so as to drop more or less, as desired.

The hoppers G G′ are made shallow, and they are provided, respectively, with bags L and L′, as shown, the upper ends of said bags being provided with draw-strings $h\ h'$. These bags are intended to hold about a peck each, and are to be tied up to the handles of the plow to which the planting attachment is connected.

By my machine the seed and fertilizer may be dropped or distributed in hills varying in size and varying in distances apart, as desired.

In rear of the wheel E is a coverer, M, hinged on the ends of the axle $a$, and working in such a way as to throw the dirt back into the furrow on top of the seed and fertilizer.

The advantages of the employment of two dropping-cylinders are as follows: Should one of the dropping-cylinders be broken or need repair, or become inoperative by reason of the seed or guano openings becoming choked, or from other causes, it can readily be removed by unscrewing the nut on the axle-rod and removing the central wheel from the frame, with its dropping-cylinders, when either or both of the dropping-cylinders may be removed by hand, there being no other fastening device for the dropping-cylinders to the central wheel than the square heads of the cylinders, fitting into the square hole in the central wheel, and abutting against each other in the square eye of the central wheel. Another dropping-cylinder, the counterpart of the broken one, may then be substituted for the one broken or inoperative. The dropping-cylinders, also, may be constructed with different-sized openings for different-sized seed—such as for cotton, wheat, rye, oats, pease, &c.; or the openings in the dropping-cylinders may be made more numerous, so that when such cylinders are placed on the axle-rod a greater quantity of grain, or seed, or guano may be sown.

By the employment of a headed bolt and nut in lieu of an axle, as ordinarily employed, the machine is rendered lighter and cheaper.

I am aware that a central wheel arranged between two hoppers for guano and seed, and provided with guano and seed droppers, attached securely to the axle of the central wheel, has heretofore been employed, and I therefore lay no claim to such construction, my invention being limited to the peculiar construction and arrangement of parts pointed out in the claim.

Having thus fully described my invention, what I claim as new, and desire to secure by Letters Patent, is—

The combination of the side beams, A A, perforated at their ends, double hoppers G G', lying on opposite sides of the central wheel, and central wheel, E, provided with a square central opening, with the removable dropping-cylinders D D', provided with guano and seed openings $d\ d'$ and square heads F F', abutting against each other in the square eye of the central wheel, and the headed axle-bolt $a$, screw-threaded at one end to receive a nut, the whole constructed and arranged to operate in the manner and for the purposes set forth.

In testimony that I claim the foregoing as my own I affix my signature in presence of two witnesses.

E. B. LOYLESS.

Witnesses:
    J. S. JANES,
    H. S. BELL.